US012671555B2

(12) United States Patent (10) Patent No.: US 12,671,555 B2
Iida (45) Date of Patent: Jun. 30, 2026

(54) COMMUNICATION APPARATUS, METHOD FOR CONTROLLING SAME, AND NON-TRANSITORY COMPUTER-READABLE STORAGE MEDIUM

(71) Applicant: CANON KABUSHIKI KAISHA, Tokyo (JP)

(72) Inventor: Kiyoshi Iida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 435 days.

(21) Appl. No.: 18/198,394

(22) Filed: May 17, 2023

(65) Prior Publication Data

US 2023/0388083 A1 Nov. 30, 2023

(30) Foreign Application Priority Data

May 26, 2022 (JP) ................................ 2022-086230

(51) Int. Cl.
H04L 5/00 (2006.01)
H04L 1/08 (2006.01)
(Continued)

(52) U.S. Cl.
CPC .............. H04L 5/0053 (2013.01); H04L 1/08 (2013.01); H04L 1/1642 (2013.01)

(58) Field of Classification Search
CPC ....... H04L 5/0053; H04L 1/08; H04L 1/1642; H04L 1/1812; H04L 1/1896; H04L 5/0055; H04L 1/1607
See application file for complete search history.

(56) References Cited

U.S. PATENT DOCUMENTS

2006/0203779 A1* 9/2006 Attar ..................... H04W 28/18
370/335
2009/0170547 A1* 7/2009 Raghothaman ....... H04L 1/0002
455/63.1
(Continued)

FOREIGN PATENT DOCUMENTS

JP 2003-258875 A 9/2003
JP 2020-150837 A 9/2020

OTHER PUBLICATIONS

3GPP TSG-RAN WG2 Meeting#117 electronic, R2-2203287 Title:Correction on HARQ attribute of SL SRB (Year: 2022).*
(Continued)

*Primary Examiner* — Faruk Hamza
*Assistant Examiner* — Abusayeed M Haque
(74) *Attorney, Agent, or Firm* — VENABLE LLP

(57) ABSTRACT
A communication apparatus uses communication with Ack message and communication without Ack message, shares with an external apparatus a data size to be received via the communication without Ack message by communicating with the external apparatus using the communication with Ack message, and receives data corresponding to one block by receiving preset data corresponding to the one block as a packet of a plurality of partial blocks using the communication without Ack message after the data size has been shared via the sharing unit. Whether reception of data corresponding to the one block has been correctly executed when a transmission completion notification for data corresponding to the one block is received from the external apparatus via the communication with Ack message is determined and transmitted to the external apparatus via the communication with Ack message until the data size is received.

14 Claims, 10 Drawing Sheets

(51) Int. Cl.
    *H04L 1/1607*     (2023.01)
    *H04W 4/80*     (2018.01)

(56)          References Cited

U.S. PATENT DOCUMENTS

| 2016/0373917 A1 | 12/2016 | Logue et al. |
| 2017/0095693 A1 | 4/2017 | Chang et al. |

OTHER PUBLICATIONS

3GPP TSG-RAN WG2#120, R2-2212195 Title:MT-SDT design principles (Year: 2022).*

Nordic Semiconductors: nRF8001 Single-chip Bluetooth low energy solution—Product Specification 1.3, Mar. 12, 2015, XP055353370.

European Search Report dated Sep. 28, 2023, in related European Patent Application No. 23174484.8.

\* cited by examiner

F I G. 3
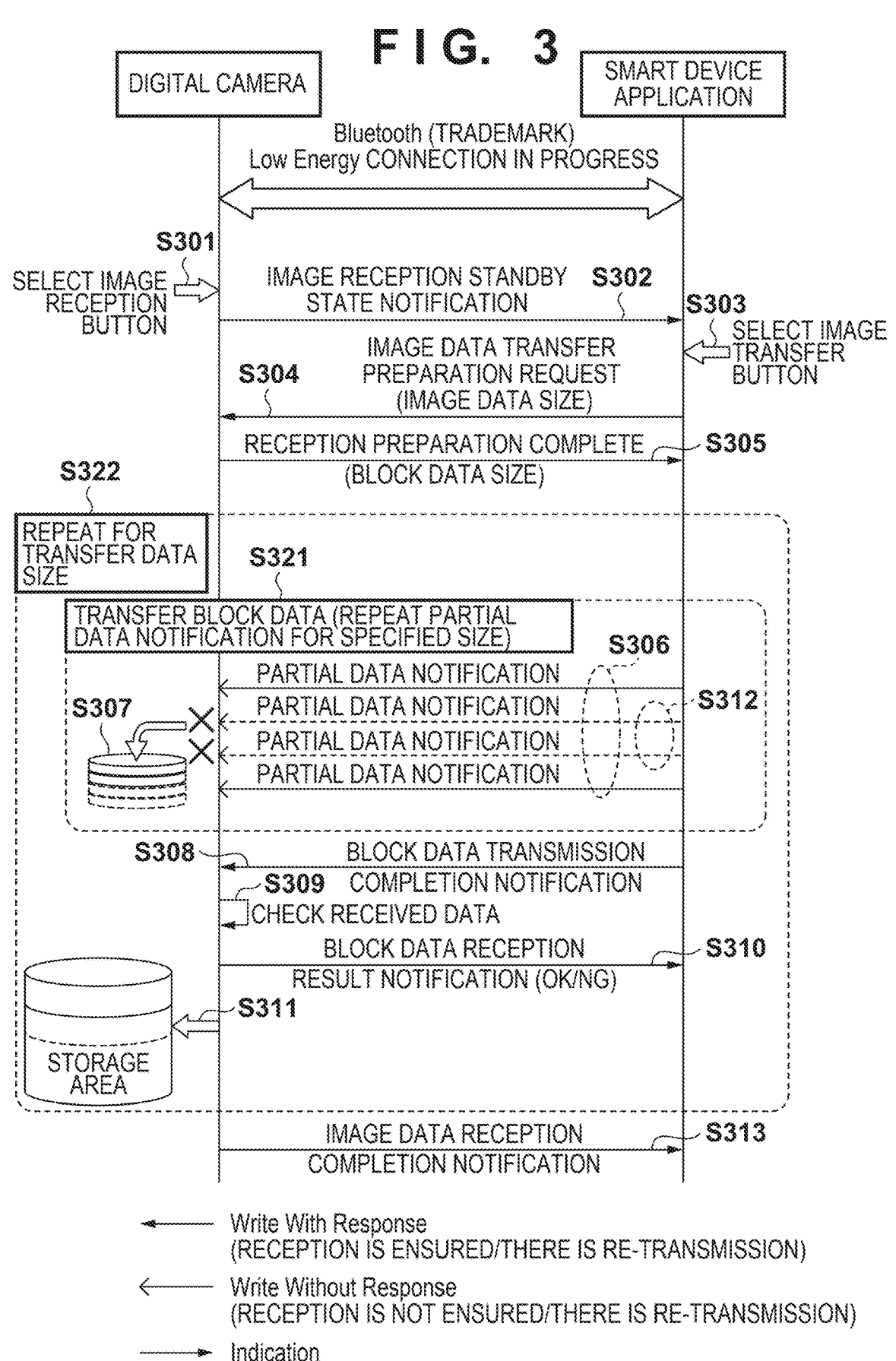

F I G.  4A
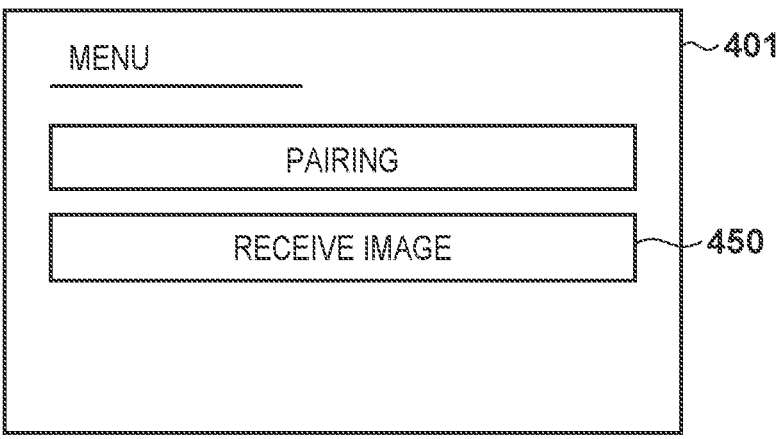
F I G.  4B
F I G.  4C
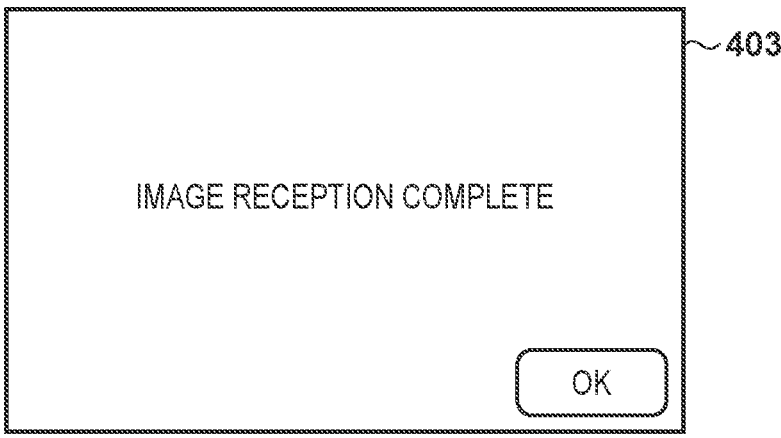

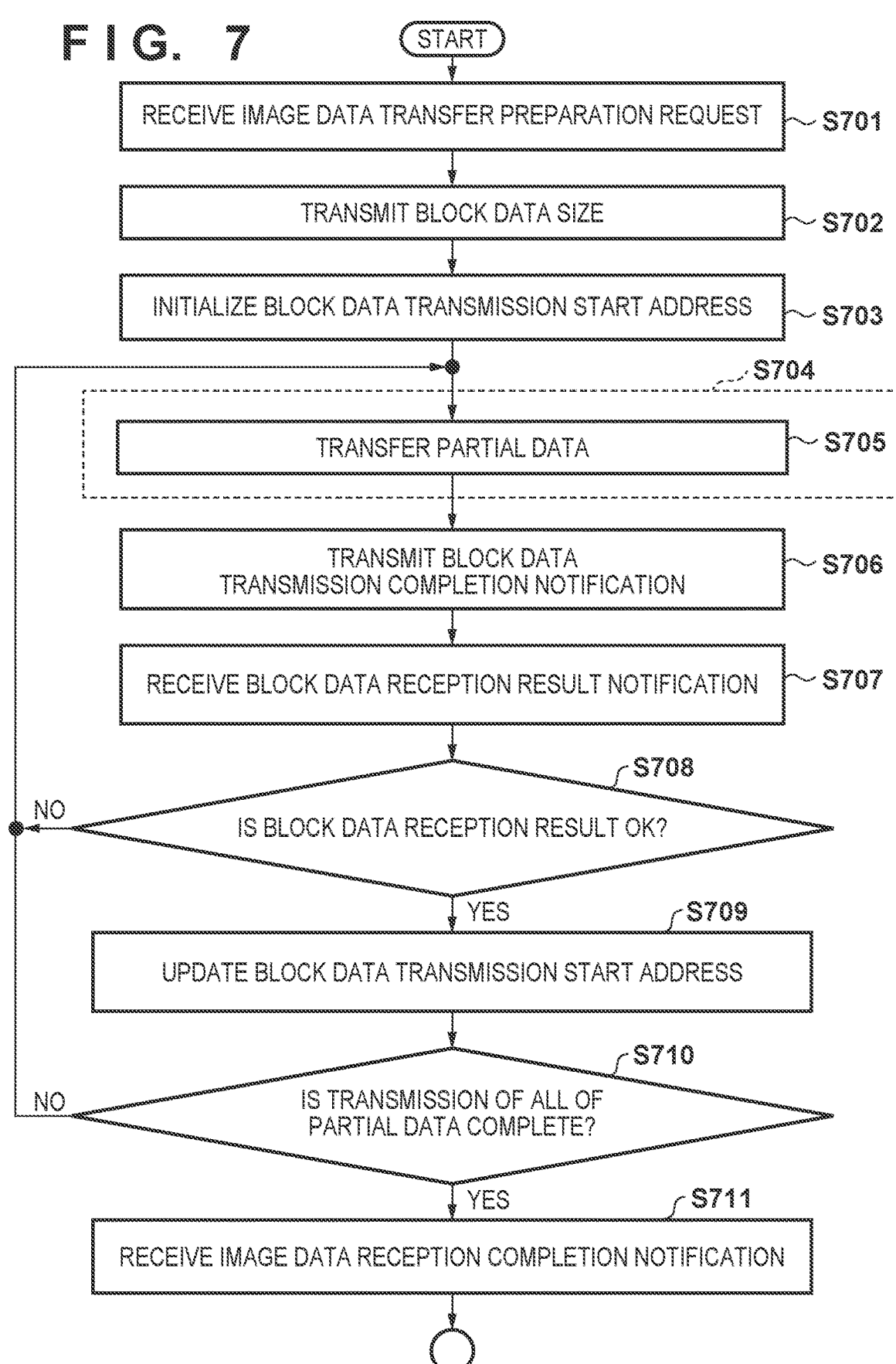
F I G. 7

F I G. 8A
801
802
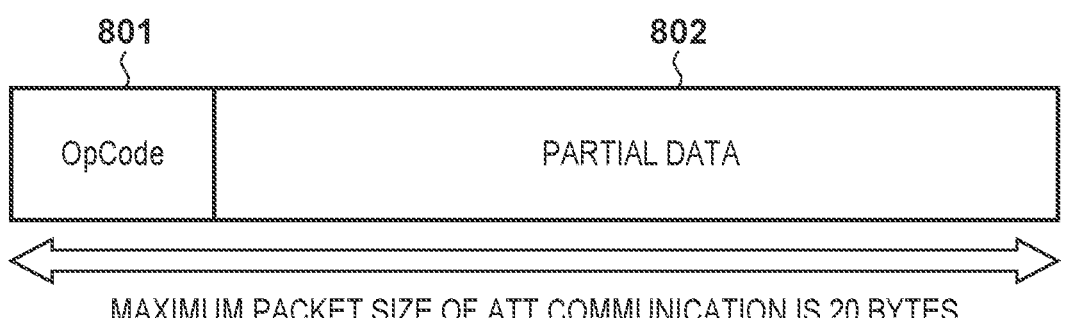
| OpCode | PARTIAL DATA |
MAXIMUM PACKET SIZE OF ATT COMMUNICATION IS 20 BYTES
F I G. 8B
803     804     805
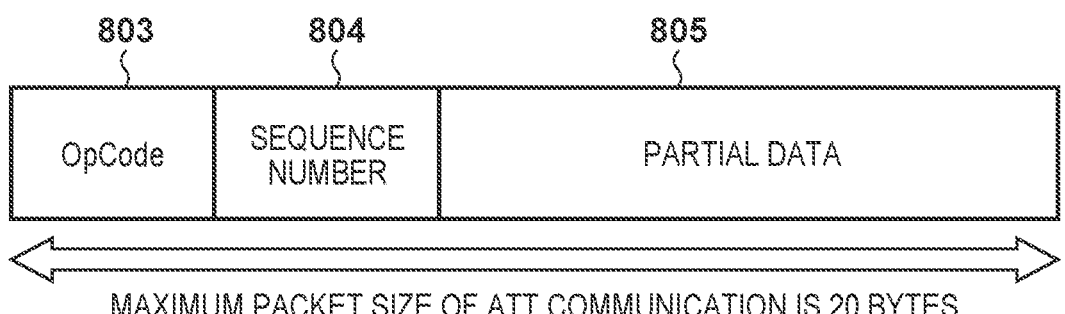
| OpCode | SEQUENCE NUMBER | PARTIAL DATA |
MAXIMUM PACKET SIZE OF ATT COMMUNICATION IS 20 BYTES

F I G. 9A

DIGITAL CAMERA

SMART DEVICE
APPLICATION

Bluetooth (TRADEMARK)
Low Energy CONNECTION IN PROGRESS

S901

SELECT IMAGE
RECEPTION
BUTTON

IMAGE RECEPTION STANDBY
STATE NOTIFICATION

S902

S903

SELECT IMAGE
TRANSFER
BUTTON

IMAGE DATA TRANSFER
PREPARATION REQUEST
(IMAGE DATA SIZE)

S904

RECEPTION PREPARATION COMPLETE
(BLOCK DATA SIZE)

S905

S923

REPEAT FOR
TRANSFER
DATA SIZE

S921

TRANSFER BLOCK DATA (REPEAT PARTIAL
DATA NOTIFICATION FOR SPECIFIED SIZE)

S906

PARTIAL DATA NOTIFICATION
(SEQUENCE NUMBER: 0)

S907

PARTIAL DATA NOTIFICATION
(SEQUENCE NUMBER: 1)

S911

PARTIAL DATA NOTIFICATION
(SEQUENCE NUMBER: 2)

PARTIAL DATA NOTIFICATION
(SEQUENCE NUMBER: 3)

Write With Response (RECEPTION IS ENSURED/
THERE IS RE-TRANSMISSION)

Write Without Response (RECEPTION IS NOT ENSURED/
THERE IS RE-TRANSMISSION)

Indication

F I G.  9B

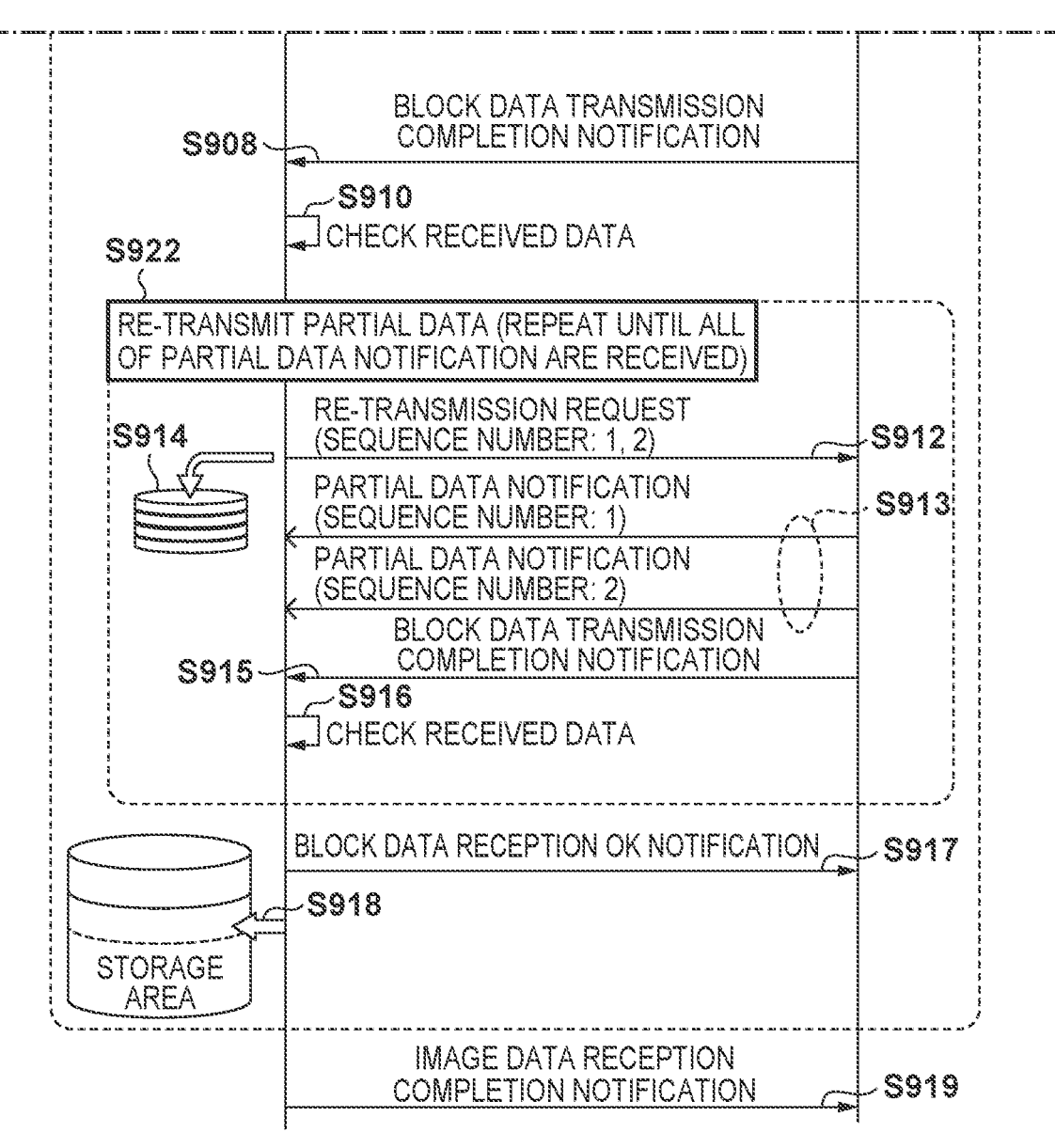

S908 — BLOCK DATA TRANSMISSION COMPLETION NOTIFICATION

S910 — CHECK RECEIVED DATA

S922

RE-TRANSMIT PARTIAL DATA (REPEAT UNTIL ALL OF PARTIAL DATA NOTIFICATION ARE RECEIVED)

S914

S912 — RE-TRANSMISSION REQUEST (SEQUENCE NUMBER: 1, 2)

S913 — PARTIAL DATA NOTIFICATION (SEQUENCE NUMBER: 1)

PARTIAL DATA NOTIFICATION (SEQUENCE NUMBER: 2)

S915 — BLOCK DATA TRANSMISSION COMPLETION NOTIFICATION

S916 — CHECK RECEIVED DATA

BLOCK DATA RECEPTION OK NOTIFICATION — S917

S918

STORAGE AREA

IMAGE DATA RECEPTION COMPLETION NOTIFICATION — S919

⟵ Write With Response (RECEPTION IS ENSURED/ THERE IS RE-TRANSMISSION)

⟵ Write Without Response (RECEPTION IS NOT ENSURED/ THERE IS RE-TRANSMISSION)

⟶ Indication

COMMUNICATION APPARATUS, METHOD FOR CONTROLLING SAME, AND NON-TRANSITORY COMPUTER-READABLE STORAGE MEDIUM

BACKGROUND OF THE INVENTION

Field of the Invention

The present invention relates to a communication apparatus, a method for controlling the same, and a non-transitory computer-readable storage medium.

Description of the Related Art

A known communication system uses both a communication method without acknowledgement (Ack) and a communication method with Ack when a plurality of apparatuses communicate.

A communication method with Ack refers to a communication method with a system that, after a message is transmitted by a transmitting side, communicates to the transmitting side that the message has been correctly received by a receiving side. Thus, with communication with Ack, when an Ack is not received from a receiving side within a certain amount of time from a message transmission by a transmitting side, the transmitting side re-transmits the same message. Until an Ack is received, re-transmission is repeated by the transmitting side. This ensures that the message is reliably received by the receiving side.

On the other hand, with a communication without Ack message, since there is no need to wait for an Ack from the destination (receiving side) of the message, throughput can be increased. However, it is unknown whether the message has been correctly received by the receiving side. Possible reasons that a without-Ack message is not correctly received include not only the message being lost due to communication path congestion or during routing but also a with-Ack message being lost. Another possible reason includes noise or the like entering the communication path and rewriting transmission data.

As described above, with a communication without Ack message, the transmitting side does not know whether the message reached the destination. Thus, a recovery method needs to be determined for when sequence processing for transmitting and receiving a message between apparatuses fails to receive a message. One such method includes determining to respond to a message with a message ID of 1 with a message with a message ID of 2. In cases in which the sequence processing does not proceed to the next step unless the message with a message ID of 2 is received, it may be determined that when a transmission source apparatus that has received the message ID of 1 does not receive a message with a message ID of 2 within a certain amount of time, the message with a message ID of 1 is re-transmitted. In this manner, even when using messages in a communication without Ack, it can function as in a communication method with Ack.

In Japanese Patent Laid-Open No. 2003-258875 (hereinafter, referred to as PTL 1), a system is described in which User Datagram Protocol (UDP), a communication method without Ack, and Transport Control Protocol (TCP), a communication method with Ack, are selectively used depending on the purpose of the communication.

In Japanese Patent Laid-Open No. 2020-150387 (hereinafter, referred to as PTL 2), a system is described in which UDP is used in normal streaming, and when a packet loss is detected, a request is sent to a re-transmission server to re-transmit the lost packet. Then, when the rate of losing packets from the re-transmission server increases, normal streaming switches to TCP, and communication with the re-transmission server is only performed for the purpose of detecting the restoration of communication quality.

However, in the known techniques described in PTL 1 and 2 described above, the data transfer sequence is not configured to use a combination of communication with Ack and communication without Ack. Even when communication without Ack is used to increase throughput, the same communication without Ack is used to ensure data reliability. In order to ensure data reliability using communication without Ack, complicated processing such as that described above is required.

SUMMARY OF THE INVENTION

The present invention has been made in consideration of the aforementioned problems and realizes communication techniques that use a communication without Ack message to increase data transfer throughput and that can ensure the reliability of data via a simple method.

The present invention in its first aspect provides a communication apparatus comprising: a communication unit configured to communicate using a communication with Ack message and a communication without Ack message; a sharing unit configured to share with an external apparatus a data size to be received via the communication without Ack message by communicating with the external apparatus using the communication with Ack message via the communication unit; a data receiving unit configured to receive data corresponding to one block by receiving preset data corresponding to the one block as a packet of a plurality of partial blocks using the communication without Ack message after the data size has been shared via the sharing unit; a determining unit configured to determine whether or not reception of data corresponding to the one block has been correctly executed when a transmission completion notification for data corresponding to the one block is received from the external apparatus via the communication with Ack message; and a control unit configured to execute transmission of a determination result of the determining unit to the external apparatus via the communication with Ack message until the data size is received.

The present invention in its second aspect provides a communication apparatus comprising: a communication unit configured to communicate using a communication with Ack message and a communication without Ack message; a storage unit configured to store a plurality of pieces of data; a sharing unit configured to share with an external apparatus a data size of data selected by a user from data stored in the storage unit by transmitting the data size to the external apparatus using the communication with Ack message; a data transmitting unit configured to transmit data corresponding to one block by transmitting preset data corresponding to the one block as a packet of a plurality of partial blocks using the communication without Ack message after the data size has been shared via the sharing unit; and a control unit configured to execute: transmitting a transmission completion notification for data corresponding to one block to the external apparatus using the communication with Ack message when transmission of data corresponding to the one block via the data transmitting unit is complete, executing re-transmission via the data transmitting unit for a transmitted block when a re-transmission request message is received from the external apparatus, and transmitting data corresponding to a following one block using the data transmitting unit when a message indicating reception success is received from the external apparatus until transmission of the data size is complete.

The present invention in its third aspect provides a method of controlling a communication apparatus having a communication unit which communicates using a communication with Ack message and a communication without Ack message, the method comprising: sharing with an external apparatus a data size to be received via the communication without Ack message by communicating with the external apparatus using the communication with Ack message via the communication unit; receiving data corresponding to one block by receiving preset data corresponding to the one block as a packet of a plurality of partial blocks using the communication without Ack message after the data size has been shared in the sharing; determining whether or not reception of data corresponding to the one block has been correctly executed when a transmission completion notification for data corresponding to the one block is received from the external apparatus via the communication with Ack message; and executing transmission of a determination result in the determining to the external apparatus via the communication with Ack message until the data size is received.

The present invention in its fourth aspect provides a method of controlling a communication apparatus having a communication unit which communicates using a communication with Ack message and a communication without Ack message and a storage unit which stores a plurality of pieces of data, the method comprising: sharing with an external apparatus a data size of data selected by a user from data stored in the storage unit by transmitting the data size to the external apparatus using the communication with Ack message; transmitting data corresponding to one block by transmitting preset data corresponding to the one block as a packet of a plurality of partial blocks using the communication without Ack message after the data size has been shared in the sharing; and executing: transmitting a transmission completion notification for data corresponding to one block to the external apparatus using the communication with Ack message when transmission of data corresponding to the one block in the transmitting is complete, executing re-transmission in the transmitting for a transmitted block when a re-transmission request message is received from the external apparatus, and transmitting data corresponding to a following one block in the transmitting when a message indicating reception success is received from the external apparatus until transmission of the data size is complete.

The present invention in its fifth aspect provides a non-transitory computer-readable storage medium storing instructions which, when read and executed by a computer, causes the computer to execute steps of a method of controlling a communication apparatus having a communication unit which communicates using a communication with Ack message and a communication without Ack message, the method comprising: sharing with an external apparatus a data size to be received via the communication without Ack message by communicating with the external apparatus using the communication with Ack message via the communication unit; receiving data corresponding to one block by receiving preset data corresponding to the one block as a packet of a plurality of partial blocks using the communication without Ack message after the data size has been shared in the sharing; determining whether or not reception of data corresponding to the one block has been correctly executed when a transmission completion notification for data corresponding to the one block is received from the external apparatus via the communication with Ack message; and executing transmission of a determination result in the determining to the external apparatus via the communication with Ack message until the data size is received.

The present invention in its sixth aspect provides a non-transitory computer-readable storage medium storing instructions which, when read and executed by a computer, causes the computer to execute steps of a method of controlling a communication apparatus having a communication unit which communicates using a communication with Ack message and a communication without Ack message and a storage unit which stores a plurality of pieces of data, the method comprising: sharing with an external apparatus a data size of data selected by a user from data stored in the storage unit by transmitting the data size to the external apparatus using the communication with Ack message; transmitting data corresponding to one block by transmitting preset data corresponding to the one block as a packet of a plurality of partial blocks using the communication without Ack message after the data size has been shared in the sharing; and executing: transmitting a transmission completion notification for data corresponding to one block to the external apparatus using the communication with Ack message when transmission of data corresponding to the one block in the transmitting is complete, executing re-transmission in the transmitting for a transmitted block when a re-transmission request message is received from the external apparatus, and transmitting data corresponding to a following one block in the transmitting when a message indicating reception success is received from the external apparatus until transmission of the data size is complete.

According to the present invention, a communication without Ack message is used to increase data transfer throughput and the reliability of data can be ensured via a simple method.

Further features of the present invention will become apparent from the following description of exemplary embodiments (with reference to the attached drawings).

BRIEF DESCRIPTION OF THE DRAWINGS

FIG. 3 is a sequence diagram illustrating an implementation method for image data transfer using the digital camera and the smart device according to the first embodiment.

FIGS. 4A to 4C are diagrams illustrating examples of UI screens displayed on the digital camera according to the first embodiment.

FIG. 7 is a flowchart illustrating a processing process for the smart device according to the first embodiment.

FIG. 8A is a diagram illustrating in detail characteristic data used in partial data notification according to the first embodiment.

FIG. 8B is a diagram illustrating in detail characteristic data used in partial data notification according to a second embodiment.

FIGS. 9A and 9B are sequence diagrams illustrating an implementation of image data transfer using a digital camera and a smart device according to the second embodiment.

DESCRIPTION OF THE EMBODIMENTS

Figures 1A, 1B, 1C:
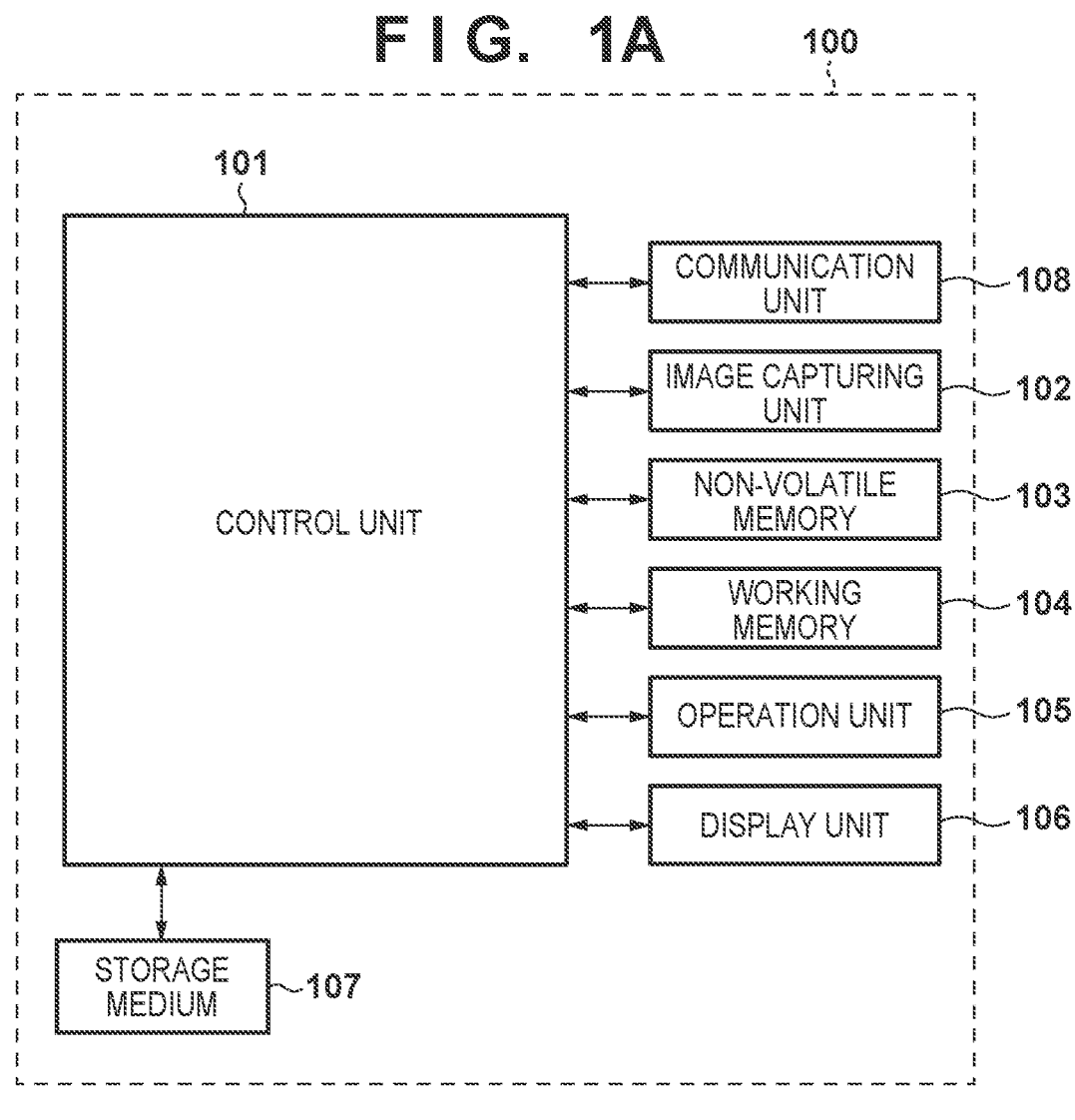
FIG. 1A is a block diagram of a digital camera according to a first embodiment.
FIGS. 1B and 1C are appearance views of the digital camera according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in the embodiments described below, a smart device is used as a communication apparatus on the transmitting side of an image and a digital camera is used as a communication apparatus on the receiving side. However, this is for the sake of convenience, and the relationship between the transmitting side and the receiving side may be reversed, and it should be noted that the communication apparatuses are not limited in type to a digital camera and a smart device.

First Embodiment

Configuration of Digital Camera

FIG. 1A is a block diagram illustrating an example of the configuration of a digital camera 100 representing a communication apparatus of the present embodiment. Note that in the description, a digital camera is used as an example of a communication apparatus, but the communication apparatus is not limited thereto. For example, the communication apparatus may be an information processing apparatus, such as a portable media player, a so-called tablet device, a personal computer, or the like.

A control unit 101 is constituted by a CPU or the like. The control unit 101 controls each unit of the digital camera 100 according to signals from outside and a program described below. Note that instead of the control unit 101 controlling the entire apparatus, a plurality of hardware may share the processing to control the entire apparatus.

An image capturing unit 102 includes, for example, an optical system that controls an optical lens unit, the diaphragm, zoom, and focus, and the like; an image sensor for converting light (video) guided through the optical lens unit into an electrical video signal; and the like. A complementary metal oxide semiconductor (CMOS) or a charge coupled device (CCD) is typically used as the image sensor. The image capturing unit 102 is controlled by the control unit 101 to convert subject light formed at the lens included in the image capturing unit 102 into an electrical signal via the image sensor, perform A/D conversion on the electrical signal, perform noise reduction processing and the like, and output digital image data. In the digital camera 100 according to the present embodiment, the image data obtained via image capture is stored in a storage medium 107 in accordance with Design Rule for Camera File system (DCF) standards.

A non-volatile memory 103 is an electrically erasable and recordable non-volatile memory that stores programs executed by the control unit 101, various types of parameters, and the like.

A working memory 104 is used as buffer memory that temporarily stores image data captured by the image capturing unit 102, image display memory for a display unit 106, work area of the control unit 101, and the like.

An operation unit 105 is used to receive instructions relating to the digital camera 100 from the user. The operation unit 105, for example, includes a power switch for the user to provide ON/OFF instructions relating to the power of the digital camera 100, a release switch for image capturing instructions, and a playback button for image data playback instructions. An operation member such as a dedicated connection button for starting communication with an external device via a communication unit 108 described below is also included. Also, the operation unit 105 includes a touch panel provided on the display unit 106 described below. Note that the release switch includes switches SW1 and SW2 for detecting two pressed states. The switch SW1 notifies the control unit 101 when turned ON by the release switch being put in a so-called half pressed state. In response to this, the control unit 101 performs image capture preparations, such as autofocus (AF) processing, automatic exposure (AE) processing, automatic white balance (AWB) processing, pre-flash emission (EF) processing, and the like. Also, the switch SW2 notifies the control unit 101 when turned ON by the release switch being put in a so-called fully pressed state. In this manner, the control unit 101 executes processing for image capture and recording.

The display unit 106 displays viewfinder images when capturing images, displays captured image data, displays alphanumerics for interactive operations, and the like. Note that the display unit 106 is not necessarily a built-in unit of the digital camera 100. It is only required that the digital camera 100 can connect to an internal or external display unit 106 and has a display control function for controlling the display of the display unit 106.

The storage medium 107 can store image data output from the image capturing unit 102. The storage medium 107 may be a memory card that is detachable from the digital camera 100 or may be built in the digital camera 100. In other words, the digital camera 100 is only necessary to include a way of accessing the storage medium 107.

The communication unit 108, for example, is communication interface including an antenna for wireless communication and a modulation/demodulation circuit or a communication controller for processing wireless signals. The communication unit 108 outputs a modulated wireless signal from the antenna or demodulates a wireless signal received by the antenna to implement short distance wireless communication in accordance with IEEE 802.15 standards (i.e., Bluetooth (trademark)).

A program for causing the digital camera 100 to operate as described above is stored in the non-volatile memory 103. Note that the communication method is not limited to Bluetooth (trademark) and may be an infrared communication method, for example. The communication unit 108 is an example of a wireless communication means.

Next, the appearance of the digital camera 100 according to the embodiment will be described. FIG. 1B is an appearance view illustrating the front surface side of the digital camera 100, and FIG. 1C is an appearance view illustrating the back surface side of the digital camera 100. The operation unit 105 described above includes operation members including a release switch 105*a*, a playback button 105*b*, a directional key 105*c*, a power switch 105*d*, and a menu button 105*e*. Also, images obtained as a result of image capture by the image capturing unit 102 are displayed on the display unit 106. This ends the description of the configuration of the digital camera 100 according to the embodiment.

Configuration of Smart Device 200

Figure 2:
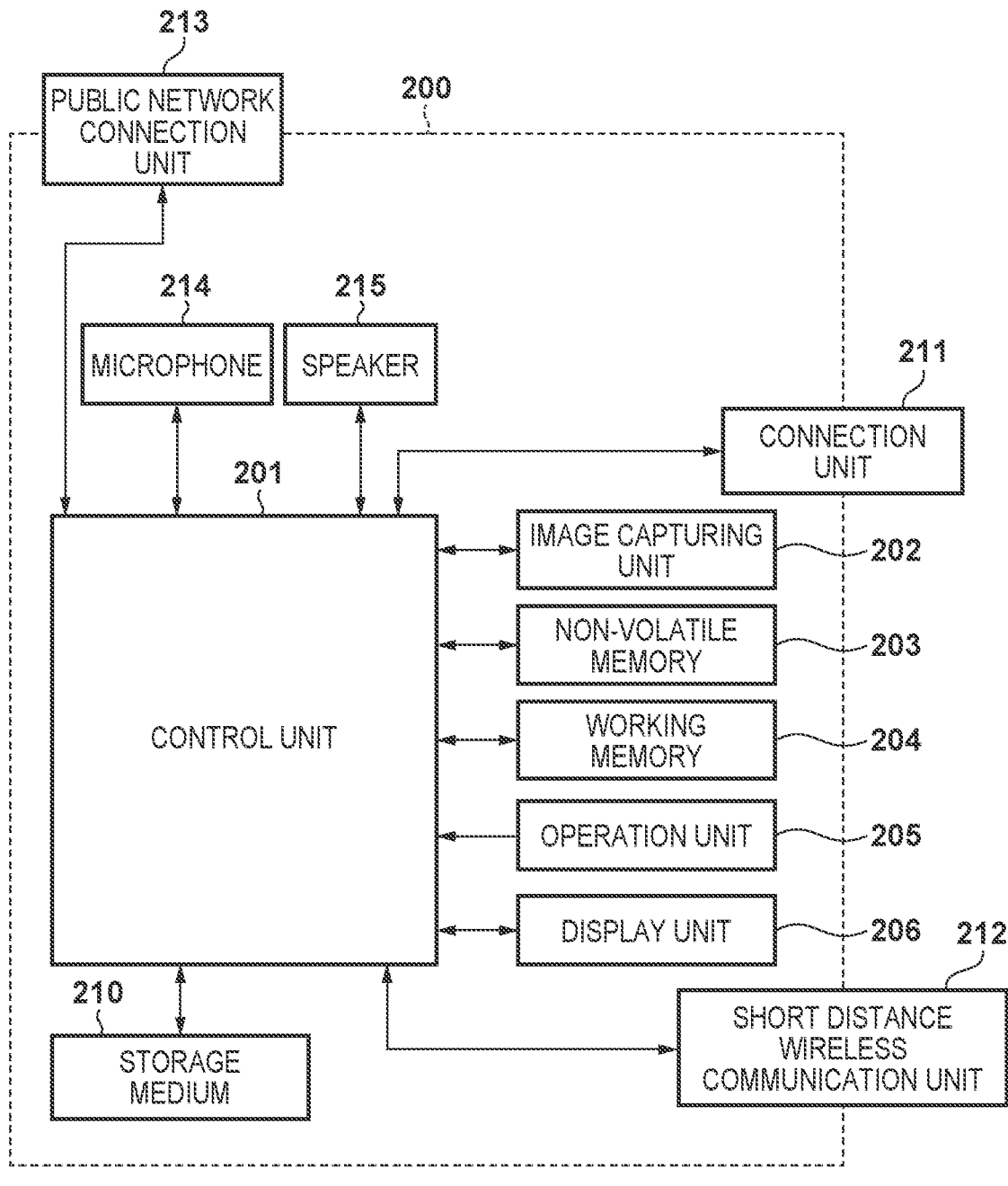
FIG. 2 is a block diagram of a smart device according to a first embodiment.

The configuration and functions of the smart device 200 according to the present embodiment will now be described with reference to FIG. 2. Note that in the present embodiment, a smart device is used as an example of an external apparatus that the digital camera 100 communicates with. However, no such limitation is intended, and a digital camera with a wireless function, a type of mobile phone such as a smart device, a tablet device, a wearable computer, and the like may be used.

The components of the smart device 200 according to the present embodiment including a control unit 201, an image capturing unit 202, a non-volatile memory 203, a working memory 204, an operation unit 205, a display unit 206, and a storage medium 207 have basically the same function as the components of the digital camera 100 with reference signs that share the same last two digits including the control unit 101, the image capturing unit 102, the non-volatile memory 103, the working memory 104, the operation unit 105, the display unit 106, and the storage medium 107. Thus, detailed descriptions are omitted, and only points of interest are described.

An operating system (OS), which is fundamental software executed by the control unit 201, and applications that cooperate with the OS to implement practical functions are stored in the non-volatile memory 203. Also, in the present embodiment, the non-volatile memory 203 stores a camera application for implementing communication processing with the digital camera 100 and control processing.

The processing of the smart device 200 when communicating with the digital camera 100 and executing control according to the present embodiment is implemented by reading software provided by an application. Note that in this example, the application includes software for using the basic function of the OS installed in the smart device 200. Also, the OS of the smart device 200 may include software for implementing the processing of the present embodiment.

A connection unit 211 includes a wireless LAN communication interface for executing wireless communication with an external apparatus such as the digital camera 100. The control unit 201 implements wireless communication with the external apparatus by controlling the connection unit 211. Note that the connection unit 211 may be directly connected to the digital camera 100 or may be connected via an access point. As the protocol for communicating data, Picture Transfer Protocol over Internet Protocol (PTP/IP) via a wireless LAN may be used, for example. Note that the communication with the digital camera 100 is not limited thereto, and an infrared communication interface or a wireless communication interface such as Wireless USB and the like may be used. Furthermore, a wired connection method, such as a USB cable, HDMI (trademark), IEEE 1394, or the like may be used.

A short distance wireless communication unit 212, for example, includes an antenna for wireless communication and a modulation/demodulation circuit or a communication controller for processing wireless signals. The short distance wireless communication unit 212 outputs a modulated wireless signal from the antenna or demodulates a wireless signal received by the antenna to implement short distance wireless communication in accordance with IEEE 802.15 standards (Bluetooth (trademark)). Note that the short distance wireless communication with the digital camera 100 is not limited thereto.

A public network connection unit 213 is an interface used when wireless communication is performed via a wide area network (WAN), such as 3G/LTE or the like. The smart device 200 can call another apparatus and communicate data via the public network connection unit 213. When calling, the control unit 201 performs input and output of audio signals via a microphone 214 and a speaker 215. In the present embodiment, the public network connection unit 213 is not limited to 3G and LTE, and another communication method, such as WiMAX, ADSL, or FTTH may be used. In the present embodiment, the public network connection unit 213 is an antenna, and the control unit 201 can connect to the public network via the antenna. Note that a single antenna may function as both the connection unit 211 and the public network connection unit 213. Note that the connection unit 211 and the public network connection unit 213 are not required to be configured by independent hardware and may both be implemented via a single antenna, for example.

Description of Bluetooth (Trademark) Low Energy Attribute Communication

In the present embodiment, Bluetooth (trademark) Low Energy is used as the communication method between the digital camera 100 and the smart device 200.

The two communication apparatuses connected using Bluetooth (trademark) Low Energy are, in terms of communication roles, a central and a peripheral. Also, the transmitting and receiving of messages at the application level of Bluetooth (trademark) Low Energy is performed using attribute communication using a generic protocol such as General Attribute protocol (GATT).

In GATT, application-level messages communicated between two devices are configured as services and characteristics and registered. A service represents a function of a peripheral device, and in the present embodiment, one service is defined as an 'image acquisition function from the smart device'. A characteristic is a read/write attribute such as a state value for the internal state of the peripheral device, operation instruction, sensor, or the like and is configured by a property and a descriptor that define the access method.

The GATT client can transmit a message to the GATT server by writing a value in a characteristic. Two methods, Write with Response (with Ack) and Write without Response (without Ack), can be used to write to GATT. Also, two methods, Notification, which is communication without Ack, and Indication, which is communication with Ack, can be used to transmit a message from the peripheral device, the GATT server, to the central device, the client.

Note that a Bluetooth (trademark) packet must include a Cyclic Redundancy Check (CRC) field. A CRC is an error detecting method, and by using a CRC, an omission or change in a part of the data in the process of communication can be detected. Advantageously, since packets that are detected to be abnormal by a CRC are discarded, the reliability of received messages is ensured even when using Write without Response and Notification, that is message transmission without Ack.

Messages with Ack are transmitted and received between the central device and the peripheral device in a connection interval (CI) period determined by the central device when connected using Bluetooth (trademark) Low Energy. The peripheral device can request a CI change, and a method of reducing the CI may be used only to raise throughput. However, the central device has the CI determining authority, and thus the CI request may not always be granted. Also, the Ack notification indicating the completion of reception needs to be sent in the next CI, and thus the desired throughput may not be obtained.

Here, by using a message without Ack, the message can be transmitted without being affected by the CI, allowing throughput to be increased. When a large capacity data transfer is performed between devices connected with a Bluetooth (trademark) Low Energy standard communication, a handover method may be used in a communication method capable of high-speed communication such as wireless LAN to increase throughput. However, a handover takes a few seconds to perform, and thus in the case of a few kilobytes of data, using a Bluetooth (trademark) Low Energy standard message without Ack is the most efficient.

Image Data Transfer Processing by Digital Camera and Smart Device

Next, image data transfer processing by the digital camera 100 and the smart device 200 according to the present embodiment will be described with reference to FIGS. 3, 4A to 4C, and 5A to 5D. Note that the communication unit 108 of the digital camera 100 and the short distance wireless communication unit 212 of the smart device 200 are both communication units compliant with the Bluetooth (trademark) standard.

FIG. 3 is a diagram illustrating sequence processing in which the digital camera 100 according to the present embodiment communicates with the smart device 200 and image data is transferred from the smart device 200 to the digital camera 100. FIGS. 4A to 4C are diagrams illustrating examples of UI screens displayed on the digital camera 100 according to the present embodiment. FIGS. 5A to 5D are diagrams illustrating examples of UI screens displayed on the smart device 200 according to the present embodiment.

The digital camera 100 and the smart device 200 are paired in advance via Bluetooth (trademark) Low Energy and connected. Pairing via Bluetooth (trademark) refers to the process of two Bluetooth (trademark) devices registering one another and specifying the partner via a method determined by the Bluetooth (trademark) standard.

Next, the sequence processing to transfer image data from the smart device 200 to the digital camera 100 will be described.

When a press of the menu button 105e by the user is detected by the control unit 101 of the digital camera 100, a menu screen 401 in FIG. 4A is displayed on the display unit 106 and selection of an image reception button 450 by the user is waited for. Then, in step S301, when the selection of the image reception button 450 by the user is detected by the control unit 101, in step S302, an image reception in progress screen 402 in FIG. 4B is displayed on the display unit 106 and an image reception standby state notification is transmitted to the smart device 200 via the communication unit 108 using a communication with Ack message.

Figures 5A, 5B, 5C, 5D:
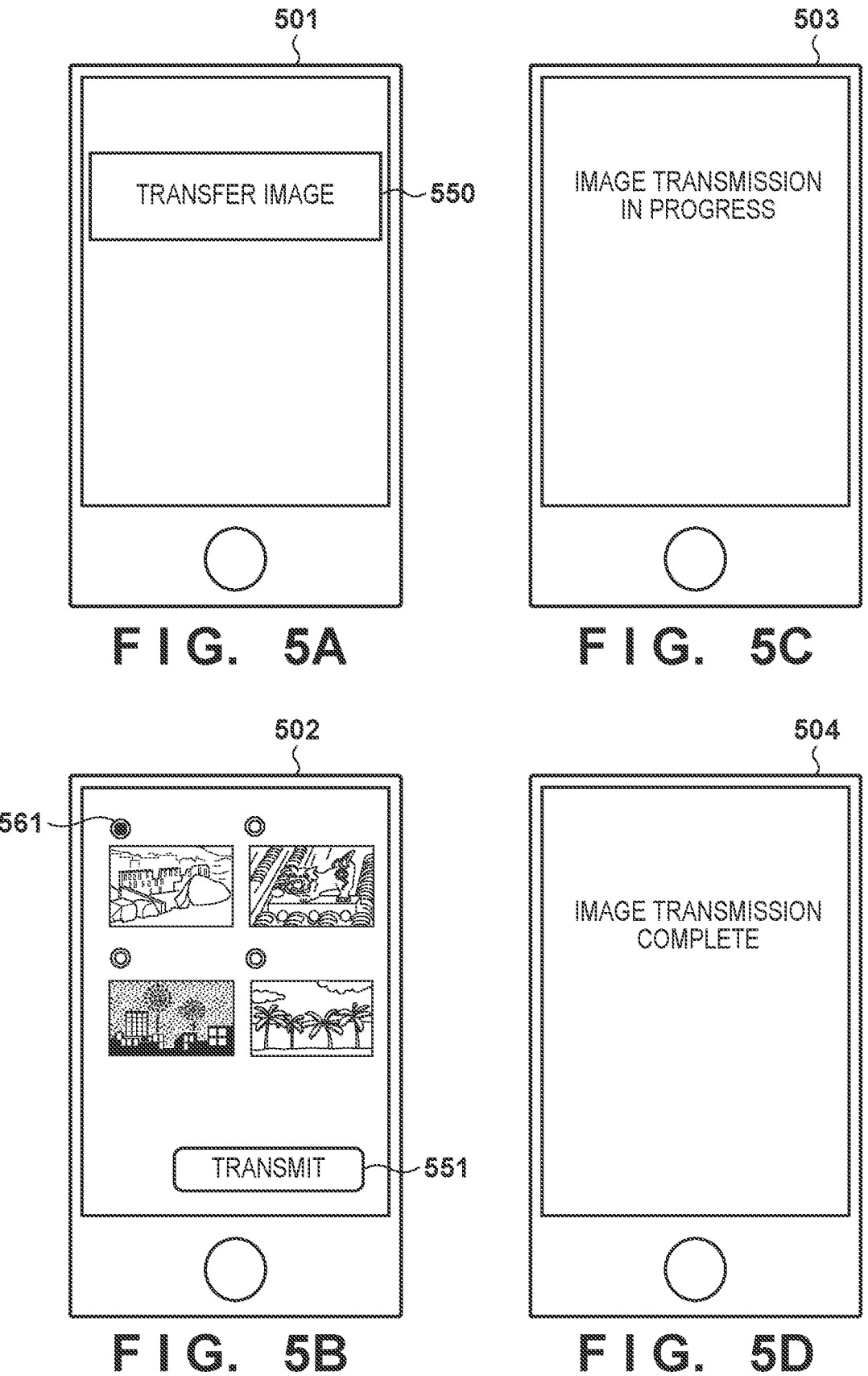
FIGS. 5A to 5D are diagrams illustrating examples of UI screens displayed on the smart device according to the first embodiment.

FIG. 5A is a diagram illustrating a main screen 501 displayed on the display unit 206 when execution of an image transfer application that runs on the smart device 200 is started. However, an image transfer button 550 on the main screen 501 at this stage is in a non-activated state (for example, displayed greyed out) indicating that the image transfer button 550 cannot be operated by the user. Then, in step S302, when the control unit 201 of the smart device 200 receives the image reception standby state notification from the digital camera 100, the image transfer button 550 on the main screen 501 is made active and the image transfer process is made able to be started by a user operation.

In step S303, when the control unit 201 of the smart device 200 detects a selection operation of the image transfer button 550 by the user via the operation unit 205, a transfer image selection screen 502 in FIG. 5B is displayed on the display unit 206. Then, the control unit 201 displays a thumbnail of a part or all of the image captured by the smart device 200 and stored in the non-volatile memory 203 or the storage medium 210 on the transfer image selection screen 502. The control unit 201 displays a radio button 561 (or a checkbox) at each thumbnail for the user to specify an image to be transferred and provides a method for the user to specify an image to transfer via the operation unit 205. Note that in a diagram, four images are illustrated, but when there are a plurality of transfer candidate images, a scrollbar may be displayed, allowing images other than the illustrated four to be specified. The user specifies one or more images to be transferred by performing a touch operation on the corresponding radio button 561. Then, in step S303, when the control unit 201 detects the selection of a transmit button 551 by the user via the operation unit 205, a process of transferring the image (not limited to one) specified by the radio button 561 is started. Accordingly, the control unit 201 of the smart device 200 displays an image transmission in progress screen 503 in FIG. 5C on the display unit 206. Then, in step S304, the control unit 201 transmits an image data transfer preparation request message to the digital camera 100 via the short distance wireless communication unit 212. In step S304, the control unit 201 notifies the digital camera 100 of the data size (the total data size of all of the specified image files when a plurality of image files are specified by the user) of the image to be transferred.

In step S304, when the control unit 101 of the digital camera 100 receives the image data transfer preparation request message, in step S305, the control unit 101 sends a message indicating that reception preparation is complete to the smart device 200. In step S305, the control unit 101 sends a message including the block data size to the smart device 200. Block data size refers to, when image data is divided for transferring, the size of the data to be transferred at one time when the control unit 201 of the smart device 200 continuously transmits a message without Ack. The size of the data (hereinafter, simply referred to as partial data) of a partial block to be transferred by one message without Ack is a fixed length defined in advance by the characteristic. The block data size is a multiple of the size of the partial data defined by the characteristic. When block data is transferred, the control unit of the receiving side is put in a high load state. Thus, the control unit 101 of the digital camera 100 specifies a block data size that is appropriate for its processing power. Note that it is sufficient that, with the block data size specified by the data receiving side, the data size of the message without Ack to be continuously transmitted can be specified. Thus, in step S305, the control unit 101 of the digital camera 100 may specify the number of messages without Ack to be continuously transmitted. Also, if the control unit 101 of the digital camera 100 is configured to accept the image data transfer preparation request S304 at any time, steps S301 and S302 may be omitted.

S321 represents a block data transfer process of transferring data with the block data size reported in step S305, repeatedly transmitting the partial data notification, that is the message without Ack. In step S306, by using the message without Ack, the partial data notification can be continuously transmitted without being affected by the CI, enabling high speed data communication. In step S307, the control unit 101 of the digital camera 100 stores partial data received in an image data storage area allocated in advance in the working memory 104 each time a partial data notification message is received.

When the control unit 201 of the smart device 200 stops transmitting the partial data notifications corresponding to the block data size via a communication without Ack message, the processing proceeds to step S308. In step S308, the control unit 201 transmits a block data transmission completion notification via a communication with Ack message. In other words, the smart device 200 transmits the block data transmission completion via a communication with Ack message each time transmission of data corresponding to one block is completed (one block units).

In step S308, by receiving the block data transmission completion notification, the control unit 101 of the digital camera 100 learns that block data transfer has ended. Then, in step S309, the control unit 101 checks whether all of the partial data reported via the message without Ack have been received. As described above, with Bluetooth (trademark), data reliability is ensured if the message can be received. Thus, it is sufficient to simply check whether the expected data size has been received. Then control unit 101 checks whether the size of the partial data received in the block data transfer in step S321 is equal to the block data size specified in step S305. Then in step S310, the control unit 101 transmits the result of the check to the smart device 200.

The dashed line arrows denoted by S312 indicate cases in which a partial data notification for a message without Ack is not received. In this case, when the control unit 101 of the digital camera 100 checks the data reception of step S309, since the total size of the partial data received by the block data transfer S321 is less than the block data size specified in step S305, in step S310, a block data reception result notification (NG: reception failure) is transmitted. Also, since the block data is not correctly received, the control unit 101 discards the received partial data and waits for the same block data to be re-transmitted. In step S310, when the control unit 201 of the smart device 200 receives an NG block data reception result notification via the short distance wireless communication unit 212, the processing returns to step S321 and the same block data is re-transmitted. Then, in step S310, the control unit 201 repeats the processing of step S306 until a block data reception result notification (OK) is received.

In this example, in step S309, the control unit 101 of the digital camera 100 has determined that all of the partial data has been received. In this case, in step S310, the control unit 101 transmits the block data reception result notification (OK) to the smart device 200. Then, in step S311, the control unit 101 moves a reception data write address of an image data storage area of the working memory 104 to an unreceived area. In step S310, when the control unit 201 of the smart device 200 receives the block data reception result notification (OK), to transfer the next non-transmitted block data, the processing of step S320 is executed. Thereafter, by the digital camera 100 and the smart device 200 repeating the processing of steps S306 to S311, via step S322, the image data specified by the user is sent from the smart device 200 to the digital camera 100.

When the control unit 101 of the digital camera 100 receives all of the image data, an image reception complete screen 403 in FIG. 4C is displayed on the display unit 106, and in step S313, an image data reception complete notification is transmitted to the smart device 200 via the communication unit 108. In step S313, when the control unit 201 of the smart device 200 receives the image data reception complete notification, an image transmission complete screen 504 in FIG. 5D is displayed on the display unit 206, and the series of transfer processing ends.

In this manner, the digital camera 100 communicates with the smart device 200 to execute image transfer processing. By transferring data using communication without Ack in this manner, the data transfer throughput can be improved.

Also, by sending a notification using communication with Ack that data transmission using communication without Ack is complete via the same communication sequence processing, data transfer completion can be detected and the reliability of the received data can be checked using a simple method.

Processing Flow for Digital Camera 100

Figure 6:
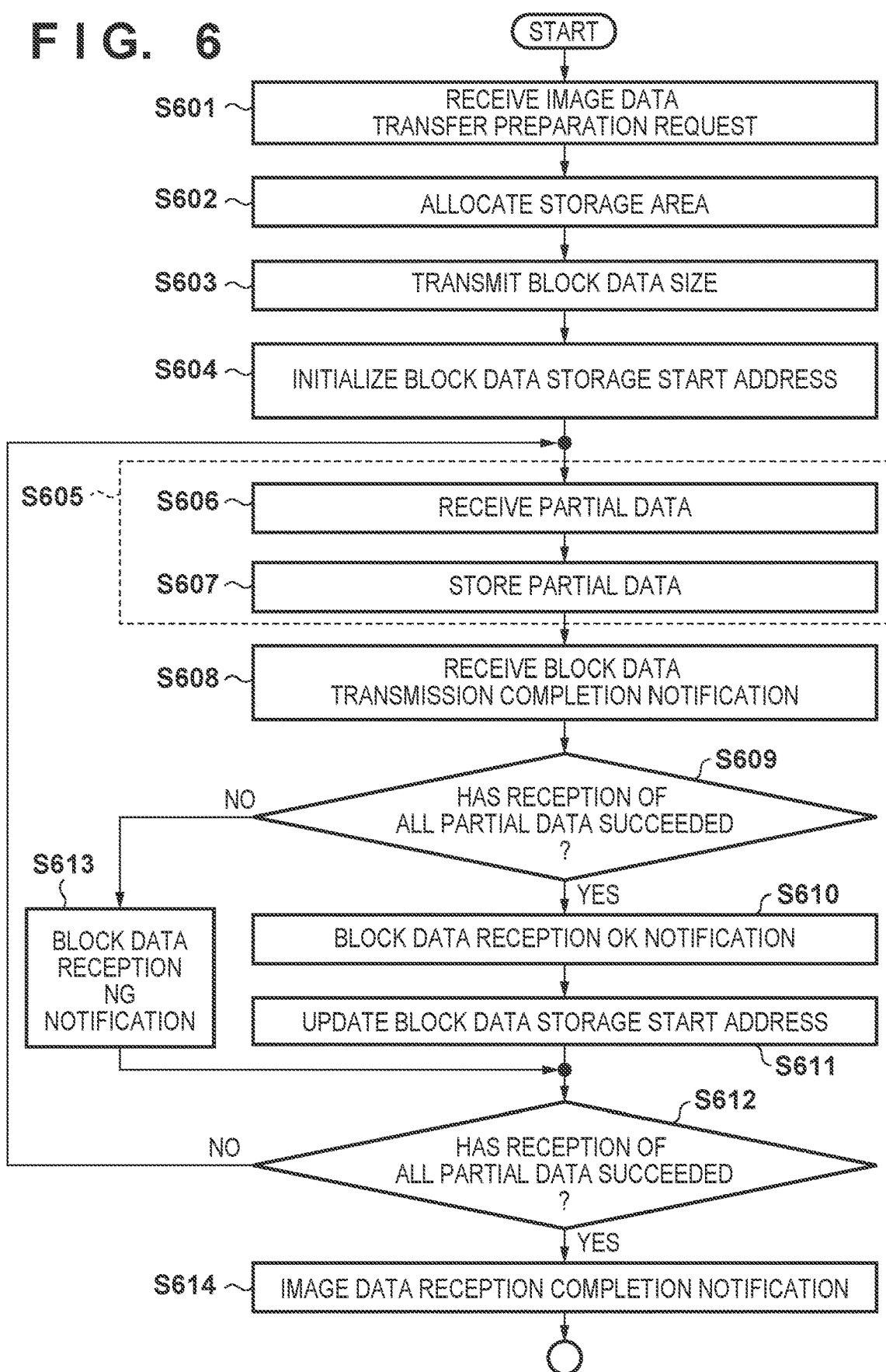
FIG. 6 is a flowchart illustrating a processing process for the digital camera according to the first embodiment.

Next, the processing flow for the control unit 101 of the digital camera 100 to acquire image data from the smart device will be described with reference to FIG. 6.

In step S601, the control unit 101 of the digital camera 100 receives an image data transfer preparation request via the communication unit 108 from the smart device 200 when in standby for image transfer. The packet of the image data transfer preparation request to be received in step S601 includes the size of the image data to be transferred. In step S602, the control unit 101 allocates a storage area for storing the image data in the working memory 104 according to the size. Next, in step S603, the control unit 101 notifies the smart device 200 via the communication unit 108 of the size of the block data to be continuously transmitted using communication without Ack. Then, in step S604, the control unit 101 initializes the block data storage start address to the start address of the image data storage area allocated in step S602.

S605 represents a block data reception processing process for acquiring the partial data of an image by the control unit 101 repeatedly receiving a communication without Ack message from the smart device 200 via the communication unit 108. Since the characteristic data length that can be used as standard in Bluetooth (trademark) Low Energy attribute communication is only 20 bytes, in step S606 within the data reception processing 605, the control unit 101 receives the partial data via the communication unit 108 and in step S607 repeats the storage of the partial data to acquire the data corresponding to the block data size specified in step S603.

Note that the data size transmitted and received in one partial data reception (step S606) is defined by the service and characteristic of GATT and thus can be agreed on by the transmitting side and the receiving side. Also, for the last block data transfer, the block data size may be smaller than the block data size specified in step S603. However, since a notification of the overall size of the image data is received in step S601, this can also be agreed on by the transmitting side and the receiving side. Accordingly, in the reception processing (step S321 in FIG. 3) of the last block data, how many times to perform partial data reception can be determined by the control unit 101 and also, when the last partial data is received, of the received partial data, where does the effective data stop and where does the dummy data start can be determined by the control unit 101, making no problem in particular occur.

The partial data reception in step S606 uses a Write without Response message. Thus, when a reception data bit error caused by a degraded radio wave situation or the like occurs, the communication unit 108 discards the message, making it likely that the message does not reach the control unit 101. Accordingly, after the block data transmission is complete, the control unit 201 of the smart device 200 transmits a block data transmission completion notification using Write with Response. In step S608, by receiving the block data transmission completion notification, the control unit 101 of the digital camera 100 can learn that block data transfer is complete. Then, in step S609, the control unit 101 compares to see whether the block data size actually received matches the block data size expected to be received. When the received size and the expected size match, the normality of the received data is ensured. Thus, when there is a match, the control unit 101 determines reception to be a success and, in step S610, sends a block data reception OK notification to the smart device 200 via the communication unit 108. Subsequently, in step S611, the control unit 101 updates the block data storage start address to the next write address of the storage area allocated in step S602.

However, in step S609, when the control unit 101 determines that the received block data size is less than (does not match) the block data size expected to be received, the processing proceeds to step S613. In step S613, the control unit 101 notifies the smart device 200 of an unsuccessful block data reception via the communication unit 108 and prompts for block data re-transmission. Since the block data has not been correctly received, the control unit 101 does not execute processing to update the block data storage start address.

Then, in step S612, the control unit 101 determines whether or not reception of all of the partial data is complete. When the control unit 101 determines that reception of all of the partial data is not complete, the processing returns to step S605 and reception processing for the remaining block data is repeated.

On the other hand, in step S612, when the control unit 101 determines that reception of all of the partial data is complete, the processing proceeds to step S614. In step S614, the smart device 200 is notified of image data reception completion via the communication unit 108.

This ends the description of the flow for the digital camera 100 according to the embodiment.
Processing Flow for Smart Device 200

Next, the processing flow for the control unit 201 of the smart device 200 to transmit image data to the digital camera 100 will be described with reference to FIG. 7. Note that the transmission processing is also the processing of an application executed by the smart device 200.

When the digital camera 100 is in an image reception standby state and the user issues an instruction to execute a smart device application, the control unit 201 of the smart device 200 displays the display screen in FIG. 5A on the display unit 206. Then, when the transfer image is selected on the screen, the control unit 201 displays the screen including a list of transmission candidate images illustrated in FIG. 5B. Then, when a press operation (touch operation) of the transmit button 551 by the user is detected, the control unit 201 starts the image transfer process.

In step S701, the control unit 201 of the smart device 200 acquires the data size of the image to be transferred and transmits an image data transfer preparation request including the data size to the digital camera 100 via the short distance wireless communication unit 212. Then, in step S702, the control unit 201 receives a block data size notification from the digital camera 100 via the short distance wireless communication unit 212. As a result, the size of the data to be transmitted and the block data size are shared between the two apparatuses. Then, in step S703, the control unit 201 reads out an image data file (not limited to one) to be transferred stored in the non-volatile memory 203 to the working memory 204 and initializes the start address as the block data transmission start address.

In step S704, the control unit 201 executes block data transmission processing to transmit partial data of the image using Write without Response. Accordingly, in step S705, the control unit 201 successively reads out partial data from the block data transmission start address and repeatedly transfers partial data corresponding to the block data size. In this manner, block data is transmitted to the digital camera 100 via the short distance wireless communication unit 212. It should be noted that, as with step S306 in FIG. 3, the processing in step S705 includes executing the transmission processing a plurality of times. Also, the partial data is transmitted using the packet illustrated in FIG. 8A. When the control unit 201 ends the block data transmission processing of step S704, the processing proceeds to step S706. In step S706, the control unit 201 transmits a block data transmission completion notification to the digital camera 100 via the short distance wireless communication unit 212. Subsequently, in step S707, the control unit 201 receives a block data reception result notification from the digital camera 100 via the short distance wireless communication unit 212. Also, in step S708, the control unit 201 determines whether NG (reception failure) or OK (reception success) is indicated by the block data reception result from the digital camera 100. When the block data reception result indicates NG, this means that the block data has not been correctly transferred to the digital camera 100. Thus, the control unit 201 returns the processing to step S704 to re-transmit the same block data. On the other hand, when the block data reception result from the digital camera 100 is OK, the control unit 201 proceeds the processing to step S709. In step S709, the control unit 201 updates the block data transmission start address to transmit the next block data. Then, in step S710, the control unit 201 determines whether or not transmission of all of the partial data is complete. When partial data to be transmitted remains, the control unit 201 returns the processing to step S704 to transmit the data of the following one block. Then, in step S710, when the control unit 201 determines that transmission of all of the partial data is complete, the processing proceeds to step S711. In step S711, the control unit 201 receives an image data reception complete notification from the digital camera 100 via the short distance wireless communication unit 212.

This ends the description of the processing flow for the control unit 201 of the smart device 200.

This also ends the description of the processing to efficiently transfer image data from the smart device 200 to the digital camera 100.

As described above, by transferring block data using Write without Response, which is communication without Ack, a message can be transmitted without being affected by the connection interval (CI). Thus, in an environment with a good radio wave situation, throughput can be improved. Also, by notifying that block data transfer using communication without Ack is complete using Write with Response, which is communication with Ack, whether the block data has been correctly received can be determined, and when the block data is not correctly received, the block data can be re-transmitted.

In the present embodiment described above, data is transferred from a central device to a peripheral device using Bluetooth (trademark) Low Energy. However, in transferring data from the peripheral device to the central device, a similar effect can be obtained by combining a Notification, which is communication without Ack, and an Indication, which is communication with Ack, in the sequence processing. By transferring the block data using a Notification, a message can be transmitted without being affected by the CI. When an Indication is used to notify that block data transfer using a Notification is complete, whether the block data has been correctly received is determined, and if the block data has not been correctly received, the block data is re-transmitted.

In the embodiment described above, one or more image files specified from among the image files stored in the smart device 200 by the user is transmitted to the digital camera 100. At this time, when the user specifies a plurality of image files, in step S304, the total size of the specified image files is transmitted from the smart device 200 to the digital camera 100 and information is shared between the smart device 200 and the digital camera 100. Thereafter, the control unit 201 of the smart device 200 transmits the plurality of selected image files connected together. When the control unit 101 of the digital camera 100 has received all of the data and the data has been stored in the working memory 104, the file header of the start of the data is analyzed, allowing the file size located at the start to be recognized. Thus, from the data following the starting file, the position of the header of the second file can be recognized. Then, by repeating this, the control unit 101 can recognize the plurality of files that constitute the received data. Then, on the basis of the recognition result described above, the control unit 101 separates the data stored in the working memory 104 into separate files and executes processing to store the files as independent files in the non-volatile memory 103.

Second Embodiment

Highly efficient data transfer according to a second example will be described next with reference to FIGS. 4A to 4C, 5A to 5D, 8A and 8B, and 9.

FIG. 8A is a diagram illustrating in detail characteristic data used in partial data notification according to the first embodiment. Also, FIG. 8B is a diagram illustrating in detail characteristic data used in partial data notification according to the second embodiment.

As described above, the characteristic data length that is the standard used in attribute communication is 20 bytes. In the first embodiment, the data is constituted by an OpCode 801 meaning a partial data notification and partial data 802. With such a data configuration, maximum throughput is obtained in environments with a good radio wave situation, but when block data transfer fails, all of the block data needs to be re-transmitted.

In the second embodiment, as illustrated in FIG. 8B, the data is constituted by an OpCode 803 representing a partial data notification, a sequence number 804 representing the sequence number of the partial data in the block data, and partial data 805. By adding the sequence number 804, the size of the partial data that can be transmitted in one partial data transfer is reduced. However, with this data configuration, when block data transfer fails, only the partial data with the sequence number not received can be re-transmitted.

The sequence processing for image data transfer using the characteristic data in FIG. 8B will now be described using FIGS. 4A to 4C, 5A to 5D, and 9.

FIGS. 9A and 9B are diagrams illustrating a sequence for transferring image data from the smart device 200 to the digital camera 100 using communication between the digital camera 100 and the smart device 200 according to the second embodiment. The screens illustrated in FIGS. 4A to 4C and 5A to 5D are displayed in similar situations to that described in the first embodiment. The digital camera 100 and the smart device 200 are paired in advance via Bluetooth (trademark) Low Energy and connected.

When a press of the menu button 105e via a user operation is detected by the control unit 101 of the digital camera 100, the menu screen 401 in FIG. 4A is displayed on the display unit 106. Then, in step S901, when a selection by the user of the image reception button 450 on the same screen is detected by the control unit 101, the processing proceeds to step S902. In step S902, the control unit 101 displays the image reception in progress screen 402 in FIG. 4B on the display unit 106 and transmits an image reception standby state notification to the smart device 200 via the communication unit 108.

Then, in step S902, when the control unit 201 of the smart device 200 receives the image reception standby state notification, the image transfer button 550 on the main screen 501 is made active and the image transfer process is made able to be started by a user operation. Then, in step S903, when the control unit 201 detects a press of the image transfer button 550 by the user via the operation unit 205, the transfer image selection screen 502 in FIG. 5B is updated and displayed on the display unit 206. At this time, the control unit 201 reads out a part or all of the images stored in the non-volatile memory 203 to the working memory 204 and displays thumbnails of the images on the transfer image selection screen 502. Also, the control unit 201 displays the radio button 561 at each thumbnail for the user to specify an image to be transferred, and the user can specify an image to transfer via the operation unit 205. In step S903, when the control unit 201 detects the selection of the transmit button 551 by the user via the operation unit 205, a process of transferring the image/s specified by the radio button 561 is started.

In step S904, the control unit 201 of the smart device 200 displays the image transmission in progress screen 503 in FIG. 5C on the display unit 206 and transmits an image data transfer preparation request message to the digital camera 100 via the short distance wireless communication unit 212. At this time, the control unit 201 includes the data size of the image to be transferred in the image data transfer preparation request message.

When the control unit 101 of the digital camera 100 receives the image data transfer preparation request message, in step S905, the control unit 101 sends a message indicating that reception preparation is complete to the smart device 200. In step S905, the control unit 101 stores the block data size in the message to be transmitted and notifies the smart device 200 of the block data size.

S921 represents a block data transfer process of transferring data with the block data size reported in step S905, repeatedly transmitting the partial data notification, that is the message without Ack. In step S906 within step S921, using a message without Ack, the partial data can be continuously transmitted without being affected by the CI. In step S907, the control unit 101 of the digital camera 100 stores partial data received in an image data storage area allocated in advance in the working memory 104 each time a partial data notification message is received. The storage destination of the block data corresponds to the start of an unreceived area of the image data storage area. In the second embodiment, a sequence number is included in the partial data notification. The sequence number corresponds to the storage destination address of the partial data in the block data. Thus, the control unit 101 stores the received partial data at the address position indicated by the sequence number in the working memory 204.

When transfer of partial data corresponding to the block data size using a communication without Ack message ends, in step S908, the control unit 201 of the smart device 200 transmits a block data transmission completion notification using a communication with Ack message.

In step S908, by receiving the block data transmission completion notification, the control unit 101 of the digital camera 100 can learn that block data transfer has ended. Thus, in step S910, the control unit 101 determines whether all of the partial data reported via the message without Ack have been received. In the second embodiment, since the received partial data is stored at the address indicated by the sequence number, the sequence numbers of the unreceived partial data can be identified.

The dashed line arrows denoted by S911 indicate cases in which, in the block data transfer in step S921, the sequence number 1 and 2 partial data notification is not received. In such cases, when there is a partial data notification that is unable to be received, in step S922, processing to re-transmit the partial data is executed. Specifically, in step S910, when the control unit 101 determines that there is unreceived partial data, the processing proceeds to step S912. In step S912, the control unit 101 transmits a re-transmission request to the smart device 200 using a message with Ack. Note that in step S912, the control unit 101 transmits a re-transmission request to the smart device 200 including the sequence number (may be a plurality) which failed reception.

In step S912, when the control unit 201 of the smart device 200 receives the re-transmission request from the digital camera 100, the processing proceeds to step S913. In step S913, the control unit 201 re-transmits the specified partial data using a message without Ack. Then, when the re-transmission of the partial data of the requested sequence number is complete, in step S915, the control unit 201 transmits a block data transmission completion notification using a message with Ack.

In step S914, the control unit 101 of the digital camera 100 stores the partial data received at the address indicated by the sequence number each time a re-transmitted partial data notification is received. In step S916, when the control unit 101 receives the block data transmission completion notification, the control unit 101 learns that the re-transmission of the partial data is complete and checks the received data. When there is still unreceived partial data, the control unit 101 returns to step S912 and prompts for partial data re-transmission. Then, the control unit 101 repeats the processing of step S912 to S916 within step S922 until all of the block data is received.

When all of the block data has been received, in step S917, the control unit 101 transmits a block data reception OK notification to the smart device 200. Then, in step S918, the control unit 101 moves the storage destination of the next block data to the start of an unreceived area of the storage area.

When the control unit 201 of the smart device 200 receives the block data reception result notification (OK), in step S921, transfer of the next unreceived block data is executed. Then, the control unit 201 repeats the processing of steps S906 to S917 within step S921 to transfer the image data from the smart device 200 to the digital camera 100.

When the control unit 101 of the digital camera 100 receives all of the image data, the image reception complete screen 403 in FIG. 4C is displayed on the display unit 106. Then, in step S918, the control unit 101 transmits an image data reception complete notification to the smart device 200 via the communication unit 108. In step S918, when the control unit 201 of the smart device 200 receives the image data reception complete notification, the image transmission complete screen 504 in FIG. 5D is displayed on the display unit 206.

In this manner, the digital camera 100 communicates with the smart device 200 to execute high-speed image transfer processing.

This also ends the description of the second embodiment to efficiently transfer image data from a smart device to a digital camera.

In the block data transfer, by adding a sequence number to the partial data notification message, the data size that can be transferred per one partial data notification is reduced, but unreceived data can be identified and only the data of the corresponding sequence number can be re-transmitted. In this manner, in an environment with a good radio wave situation, throughput can be improved, and even when the radio wave situation is bad, the number of data re-transmissions can be reduced and data can be transferred efficiently.

Third Embodiment

A configuration may be used that allows the user of the digital camera 100 to select whether to use the configuration in FIG. 8A or FIG. 8B as the packet without Ack. This example according to the third embodiment will now be described. Bluetooth (trademark) is a short distance communication standard, and is greatly affected by large numbers of devices using the same frequency band nearby. In other words, the packet format in FIG. 8A is efficient when there are few devices using radio waves nearby, and the packet format in FIG. 8B is efficient when there are many devices using radio waves nearby. The user can estimate to an extent whether or not there is a small or large number of devices using radio waves from whether or not the user is in a crowded area. Instead of the image reception button 450 in FIG. 4A, two buttons, a crowded area image reception button and a non-crowded area image reception button, may be displayed. When the non-crowded area image reception button is selected, the packet illustrated in FIG. 8A is used, and when the crowded area image reception button is selected, the packet in FIG. 8B is used. Thus, when the user selects one of the two, the control unit 101 of the digital camera 100 sends the smart device 200 an image reception standby state notification including information indicating which packet to use. As a result, both the control unit 101 of the digital camera 100 and the control unit 201 of the smart device 200 can share the information indicating whether to use the configuration in FIG. 8A or FIG. 8B. Thereafter, the digital camera 100 and the smart device 200 may execute processing according to the first embodiment or the second embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-086230, filed May 26, 2022, which is hereby incorporated by reference herein in its entirety.

What is claimed is:

1. A communication apparatus comprising:
at least one memory containing instructions and at least one processor for executing the instructions to operate as:
a communication unit configured to communicate using a communication with Ack message and a communication without Ack message;
a sharing unit configured to share with an external apparatus a data size to be received via the communication without Ack message by communicating with the external apparatus using the communication with Ack message via the communication unit;
a data receiving unit configured to receive data corresponding to one block by receiving preset data corresponding to the one block as a packet of a plurality of partial blocks using the communication without Ack message after the data size has been shared via the sharing unit;
a determining unit configured to determine whether or not reception of data corresponding to the one block has been correctly executed when a transmission completion notification for data corresponding to the one block is received from the external apparatus via the communication with Ack message; and
a control unit configured to execute transmission of a determination result of the determining unit to the external apparatus via the communication with Ack message until the data size is received.

2. The apparatus according to claim 1, wherein
the communication unit is a communication interface compliant with Bluetooth (trademark) Low Energy standard,
the communication with Ack message is a communication message using Write with Response in General Attribute protocol (GATT), and
the communication without Ack message is a communication message using Write without Response in GATT.

3. The apparatus according to claim 1, wherein
the sharing unit shares the data size by receiving the communication with Ack message from the external apparatus.

4. The apparatus according to claim 1, wherein the instructions are further executed to operate as a second sharing unit configured to share with the external apparatus a size of the one block by transmitting a size of the one block to the external apparatus via the communication with Ack message.

5. The apparatus according to claim 1, wherein
when a transmission completion notification for data corresponding to the one block is received from the external apparatus via the communication with Ack message, the determining unit determines data reception to be normal if a size of data received by the data receiving unit until then matches a size of the one block and determines reception to be a failure when there is no match.

6. The apparatus according to claim 5, wherein
the packet includes a sequence number, and
when a determination result of the determining unit indicates reception failure, the control unit transmits a re-transmission request for a packet with a missing sequence number to the external apparatus using the communication with Ack message.

7. A communication apparatus comprising:
at least one memory containing instructions and at least one processor for executing the instructions to operate as:
a communication unit configured to communicate using a communication with Ack message and a communication without Ack message;
a storage unit configured to store a plurality of pieces of data;
a sharing unit configured to share with an external apparatus a data size of data selected by a user from data stored in the storage by transmitting the data size to the external apparatus using the communication with Ack message;
a data transmitting unit configured to transmit data corresponding to one block by transmitting preset data corresponding to the one block as a packet of a plurality of partial blocks using the communication without Ack message after the data size has been shared via the sharing unit; and
a control unit configured to execute transmitting a transmission completion notification for data corresponding to one block to the external apparatus using the communication with Ack message when transmission of data corresponding to the one block via the data transmitting unit is complete, executing re-transmission via the data transmitting unit for a transmitted block when a re-transmission request message is received from the external apparatus, and transmitting data corresponding to a following one block using the data transmitting unit when a message indicating reception success is received from the external apparatus until transmission of the data size is complete.

8. The apparatus according to claim 7, wherein
the communication unit is a communication interface compliant with Bluetooth (trademark) Low Energy standard,
the communication with Ack message is communication using Write with Response in General Attribute protocol (GATT), and
the communication without Ack message is communication using Write without Response in GATT.

9. The apparatus according to claim 7, wherein the instructions are further executed to operate as a second sharing unit configured to share with the external apparatus a size of the one block by receiving a size of the one block from the external apparatus via the communication with Ack message.

10. The apparatus according to claim 7, wherein the data transmitting unit transmits the packet of the plurality of partial blocks including sequence numbers as a communication without Ack message, and the control unit controls the data transmitting unit and, when a request for re-transmission using a sequence number is received, re-transmits a packet including the sequence number.

11. A method of controlling a communication apparatus having a communication unit which communicates using a communication with Ack message and a communication without Ack message, the method comprising:

sharing with an external apparatus a data size to be received via the communication without Ack message by communicating with the external apparatus using the communication with Ack message via the communication unit;

receiving data corresponding to one block by receiving preset data corresponding to the one block as a packet of a plurality of partial blocks using the communication without Ack message after the data size has been shared in the sharing;

determining whether or not reception of data corresponding to the one block has been correctly executed when a transmission completion notification for data corresponding to the one block is received from the external apparatus via the communication with Ack message; and executing transmission of a determination result in the determining to the external apparatus via the communication with Ack message until the data size is received.

12. A method of controlling a communication apparatus having a communication unit which communicates using a communication with Ack message and a communication without Ack message and a storage unit which stores a plurality of pieces of data, the method comprising:

sharing with an external apparatus a data size of data selected by a user from data stored in the storage unit by transmitting the data size to the external apparatus using the communication with Ack message;

transmitting data corresponding to one block by transmitting preset data corresponding to the one block as a packet of a plurality of partial blocks using the communication without Ack message after the data size has been shared in the sharing; and executing transmitting a transmission completion notification for data corresponding to one block to the external apparatus using the communication with Ack message when transmission of data corresponding to the one block in the transmitting is complete, executing re-transmission in the transmitting for a transmitted block when a re-transmission request message is received from the external apparatus, and transmitting data corresponding to a following one block in the transmitting when a message indicating reception success is received from the external apparatus until transmission of the data size is complete.

13. A non-transitory computer-readable storage medium storing instructions which, when read and executed by a computer, causes the computer to execute steps of a method of controlling a communication apparatus having a communication unit which communicates using a communication with Ack message and a communication without Ack message, the method comprising:

sharing with an external apparatus a data size to be received via the communication without Ack message by communicating with the external apparatus using the communication with Ack message via the communication unit;

receiving data corresponding to one block by receiving preset data corresponding to the one block as a packet of a plurality of partial blocks using the communication without Ack message after the data size has been shared in the sharing;

determining whether or not reception of data corresponding to the one block has been correctly executed when a transmission completion notification for data corresponding to the one block is received from the external apparatus via the communication with Ack message; and executing transmission of a determination result in the determining to the external apparatus via the communication with Ack message until the data size is received.

14. A non-transitory computer-readable storage medium storing instructions which, when read and executed by a computer, causes the computer to execute steps of a method of controlling a communication apparatus having a communication unit which communicates using a communication with Ack message and a communication without Ack message and a storage unit which stores a plurality of pieces of data, the method comprising:

sharing with an external apparatus a data size of data selected by a user from data stored in the storage unit by transmitting the data size to the external apparatus using the communication with Ack message;

transmitting data corresponding to one block by transmitting preset data corresponding to the one block as a packet of a plurality of partial blocks using the communication without Ack message after the data size has been shared in the sharing; and executing transmitting a transmission completion notification for data corresponding to one block to the external apparatus using the communication with Ack message when transmission of data corresponding to the one block in the transmitting is complete, executing re-transmission in the transmitting for a transmitted block when a re-transmission request message is received from the external apparatus, and transmitting data corresponding to a following one block in the transmitting when a message indicating reception success is received from the external apparatus until transmission of the data size is complete.

* * * * *